(12) United States Patent
Hong

(10) Patent No.: US 10,918,189 B2
(45) Date of Patent: Feb. 16, 2021

(54) REFILL CONTAINER USING DOUBLE INJECTION

(71) Applicant: AMOREPACIFIC CORPORATION, Seoul (KR)

(72) Inventor: Sung Soo Hong, Seoul (KR)

(73) Assignee: AMOREPACIFIC CORPORATION, Seoul (KR)

( * ) Notice: Subject to any disclaimer, the term of this patent is extended or adjusted under 35 U.S.C. 154(b) by 68 days.

(21) Appl. No.: 16/093,571

(22) PCT Filed: Apr. 14, 2017

(86) PCT No.: PCT/KR2017/004035
§ 371 (c)(1),
(2) Date: Oct. 12, 2018

(87) PCT Pub. No.: WO2017/179932
PCT Pub. Date: Oct. 19, 2017

(65) Prior Publication Data
US 2019/0166975 A1    Jun. 6, 2019

(30) Foreign Application Priority Data

Apr. 15, 2016 (KR) .................. 10-2016-0045969
Mar. 3, 2017 (KR) .................. 10-2017-0027896

(51) Int. Cl.
*A45D 33/24* (2006.01)
*A45D 40/22* (2006.01)
(Continued)

(52) U.S. Cl.
CPC ............ *A45D 34/00* (2013.01); *A45D 33/24* (2013.01); *A45D 40/22* (2013.01); *B65D 1/40* (2013.01);
(Continued)

(58) Field of Classification Search
CPC .... A45D 33/006; A45D 33/025; A45D 34/00; A45D 33/24; A45D 40/22; A45D 1/40;
(Continued)

(56) References Cited

U.S. PATENT DOCUMENTS 5,842,486 A * 12/1998 Davis .................. A45C 13/008
132/295
5,908,037 A *  6/1999 Pierson ................ A45D 33/006
132/293
(Continued)

FOREIGN PATENT DOCUMENTS

KR    10-2012-0016493 A    2/2012
KR    10-2013-0000266 A    1/2013
(Continued)

*Primary Examiner* — Andrew T Kirsch
(74) *Attorney, Agent, or Firm* — Heedong Chae; Lucem, PC

(57) ABSTRACT

The present invention relates to a refill container using double injection, comprising: a refill container for containing a cosmetic material, wherein the refill container is formed of a synthetic resin or a metallic material and has an impregnation member in which the cosmetic material is impregnated; a refill container holder which is coupled to the top of the refill container; and a refill container cover which is opened and closed by being hinge-coupled to the refill container holder, wherein the refill container holder is formed by doubly injecting or insert-injecting a packing part of an elastic material therein, and the top of the refill container and the packing part are coupled when the refill container and the refill container holder are coupled.

9 Claims, 9 Drawing Sheets

(51) Int. Cl.
- *B65D 53/02* (2006.01)
- *A45D 34/00* (2006.01)
- *B65D 1/40* (2006.01)
- *B65D 43/16* (2006.01)
- *B65D 81/24* (2006.01)

(52) U.S. Cl.
CPC ........... *B65D 43/165* (2013.01); *B65D 53/02* (2013.01); *B65D 81/245* (2013.01); *A45D 2200/051* (2013.01)

(58) Field of Classification Search
CPC .... A45D 43/165; A45D 53/02; A45D 81/245; A45D 2200/051; A45D 33/003; A45D 40/18; A45D 33/04; A45D 33/00; A45D 40/24; A45D 33/008; B65D 7/04; B65D 21/00; B65D 43/165; B65D 53/02; A45C 11/008; A45C 5/005
USPC ......................................... 132/264, 293, 300
See application file for complete search history.

(56) References Cited

U.S. PATENT DOCUMENTS

| | | | | |
|---|---|---|---|---|
| 7,597,211 | B2* | 10/2009 | Kang | A45D 33/006 132/293 |
| 8,789,540 | B2* | 7/2014 | Lee | A45C 13/008 132/293 |
| 2008/0276956 | A1* | 11/2008 | Cho | A45D 33/006 132/294 |
| 2012/0125928 | A1* | 5/2012 | Bodum | A47J 47/06 220/200 |
| 2013/0087165 | A1* | 4/2013 | Lee | A45D 33/00 132/286 |
| 2014/0283870 | A1* | 9/2014 | Byeon | A45D 33/006 132/315 |

FOREIGN PATENT DOCUMENTS

| | | |
|---|---|---|
| KR | 10-1382883 B1 | 4/2014 |
| KR | 10-1505789 B1 | 3/2015 |
| KR | 10-1584512 B1 | 1/2016 |

* cited by examiner

-- PRIOR ART --

-- PRIOR ART --

-- PRIOR ART --

REFILL CONTAINER USING DOUBLE INJECTION

CROSS-REFERENCE TO RELATED APPLICATIONS

This application is based on and claims the benefit of priority to Korean Patent Application No. 10-2016-0045969 filed on Apr. 15, 2016, and Korean Patent Application No. 10-2017-27896 filed on Mar. 3, 2017, with the Korean Intellectual Property Office, the disclosure of which is incorporated herein by reference.

TECHNICAL FIELD

The present invention relates to a refill container using double injection molding, and more particularly, to a refill container using double injection molding, which is capable of preventing leakage of a cosmetic material therein by coupling an upper end of the refill container and a packing part when the refill container is coupled with a refill container holder, and of sealing the refill container without any additional components by double injecting or inserting the packing part of an elastic material into the refill container holder, so that the assembling process is simplified to improve the productivity and reduce the cost, where the refill container is provided therein with an impregnation member which contains a cosmetic material, is formed of a synthetic resin or a metal material, and is impregnated therein with a cosmetic material therein, the refill container holder is coupled to an upper portion of the refill container, and a refill container lid is hinge coupled to the refill container holder.

BACKGROUND ART

Color cosmetics, which are used to beautifully adorn the skin of a user by making the appearance beautiful, are classified into a base makeup used for making a skin color uniform and capping a defect and a point makeup used for partially enhancing a three-dimensional effect of a lip, eyes, or nails. The base makeup includes a makeup base, a foundation and a powder, and the point makeup includes a lipstick, an eye liner, and mascara.

The foundation is classified into solid-type foundation, liquid-type foundation and gel-type foundation according to a type of cosmetic contents. In case of the solid-type foundation, although the solid-type foundation has a good cover effect, the makeup is united when the makeup is refreshed. In case of the liquid-type foundation, although the liquid-type foundation gives a good close contact feel, the persistency is weak. Thus, in recent years, the number of customers favoring the gel-type foundation having a considerable persistency and a good close contact feel has been increased.

Therefore, there is need to develop a container for gel-type foundation. Generally, the gel-type foundation, which is filled into a glass container or a tub-type container, is used in such a manner that a user takes some foundation on his hands for use or squeezes foundation from the container and then, coats the foundation on his skin by using a puff or his hands.

However, according to the related art, since a user gets cosmetics on his hands every time that it is used, it is inconvenient to wash hands every time after use. In addition, as the hands coated with cosmetics are washed, the cosmetics are wasted.

To solve the above problems, as shown in FIG. 1, a compact container is disclosed in Korean Registered Patent No. 10-1257628 issued to the applicant of the present application, where the compact container includes an inner container in which an impregnation member 1 impregnated therein with cosmetic material is embedded. Thus, a user uses the cosmetics impregnated to the impregnation member 1 by getting a puff the cosmetics for makeup, so that the cosmetic can be used without coating user's hands with the cosmetics.

However, according to the related art, since the cosmetic material impregnated into the impregnation member 1 contains a large amount of a volatile raw material, when the sealing strength of the inner container containing the cosmetic material is deteriorated, the volatile raw material is evaporated into the atmosphere and the cosmetics are hardened so that the inherent function of the cosmetics is lost. Thus, there is a need to provide a method of blocking evaporation of the volatile raw material of the cosmetics.

To solve the above problems, as shown in FIG. 2, an airtight cosmetic container is disclosed in Korean Registered Patent No. 10-1297824 issued to the applicant of the present application. According to the related art, a sealing rib 3, which is formed on a lower portion of a packing case lid, is inserted into a packing groove formed in a packing case 2 to effectively seal the packing case 2, so that the cosmetics may be prevented from evaporating.

However, according to the related art, the inner container 4 is formed of a synthetic resin material. As described above, since the inner container 4 is formed of a synthetic resin material so that the inner container 4 must be formed to have a certain thickness, the space for containing the cosmetics is reduced so that it is limited to maximize the amount of cosmetics filled in the inner container 4.

In addition, the volatile raw material of the cosmetics contained in the inner container 4 gradually passes through the content container 4 formed of a synthetic resin material to evaporate and volatilize to an outside, so that the contents of the cosmetics are deteriorated or reduced.

To solve the above problems, as shown in FIG. 3, a cosmetic container is disclosed in Korean Registered Patent No. 10-1584512 issued to the applicant of the present application. According to the related art, since the refill container 5 is formed of a metal material, it is possible to form the refill container 5 to have a thin thickness, so that the space for containing cosmetics may be maximized in the refill container. In order to prevent the cosmetics from leaking due to the nature of the metal material when the refill container is coupled to the refill container holder made of a synthetic resin material, the sealing ring 6 having a section of an inverted-U shape is coupled to an upper portion of the refill container, so that the leakage and seal of the contents may be effectively achieved.

However, according to the above-described related art, an assembly process of coupling the sealing ring 6 in such a manner that the refill container 5 is coupled to the refill container holder by coupling the sealing ring 6, which is a separate component, to the upper portion of the refill container 5, so that the time taken to manufacture the cosmetic container is increased, thereby decreasing the productivity and increasing the cost.

In addition, when the sealing ring 6 is coupled to the refill container 5, the sealing ring 6 is simply fitted into the refill container 5, so that the sealing ring 6 may be disengaged, so the cosmetics may not be prevented from leaking.

DISCLOSURE

Technical Problem

To solve the problems described above, an object of the present invention is to provide a refill container using double injection molding, which is capable of preventing leakage of a cosmetic material therein by coupling an upper end of the refill container and a packing part when the refill container is coupled with a refill container holder, and of sealing the refill container without any additional components by double injecting or inserting the packing part of an elastic material into the refill container holder, so that the assembling process is simplified to improve the productivity and reduce the cost, where the refill container is provided therein with an impregnation member which contains a cosmetic material, is formed of a synthetic resin or a metal material, and is impregnated therein with a cosmetic material therein, the refill container holder is coupled to an upper portion of the refill container, and a refill container lid is hinge coupled to the refill container holder.

Technical Solution

According to the present invention, there is provided a refill container using double injection molding, which includes:

a refill container (10) containing cosmetics;

a refill container holder (20) coupled to an upper portion of the refill container (10); and a refill container lid (50) connected to the refill container holder (20) to be opened and closed, wherein a packing part (30) of an elastic material is formed to an inside of the refill container holder (20) through double-injection molding or insert molding on a portion where an upper end of the refill container (10) is coupled, a control protrusion wheel coupling groove (26) is formed on a low portion of one side of the refill container holder (20), and a control protrusion wheel (33) for controlling an injection flow is formed in the control protrusion wheel coupling groove (26).

The refill container further includes an impregnation member (60) impregnated therein with the cosmetics and mounted in the refill container (10).

The refill container (10) is formed on an outer peripheral surface thereof with a first latching protrusion wheel (16) and the refill container holder (20) is formed on an inner peripheral surface thereof with a second latching protrusion wheel (22) coupled to the first latching protrusion wheel (12).

The refill container (10) is formed of synthetic resin material.

The refill container (10) is formed of at least one of stainless steel, iron (Fe), aluminum (Al), copper (Cu), tungsten (W), nickel (Ni), tin (Sn), magnesium (Mg), calcium (Ca), titanium (Ti), zinc (Zn), and gallium (Ga).

The packing part (30) is formed of at least one of thermo plastic elastomer (TPE), polyethylene (PE), natural rubber, urethane rubber, nitrile-butadiene rubber (NBR), and silicone.

The packing part (30) is formed on an inside thereof with an inserting groove (31) into which an upper portion of the refill container (10) is inserted and sealing protrusion wheels (32) are formed in the inserting groove (31) while facing each other.

The sealing protrusion wheels (32) are offset from each other.

The packing part (30) is formed on an outer periphery of an opposite side thereof with a coupling protrusion wheel (34), the refill container holder (20) is formed on an inner periphery of an opposite side thereof with a coupling groove (27), and the coupling protrusion wheel (34) and the coupling groove (27) are coupled to each other.

Advantageous Effects

According to the present invention, the refill container using double injection molding is capable of preventing leakage of a cosmetic material therein by coupling an upper end of the refill container and a packing part when the refill container is coupled with a refill container holder, and of sealing the refill container without any additional components by double injecting or inserting the packing part of an elastic material into the refill container holder, so that the assembling process is simplified to improve the productivity and reduce the cost, where the refill container is provided therein with an impregnation member which contains a cosmetic material, is formed of a synthetic resin or a metal material, and is impregnated therein with a cosmetic material therein, the refill container holder is coupled to an upper portion of the refill container, and a refill container lid is hinge coupled to the refill container holder.

BEST MODE

Mode for Invention

Hereinafter, a gel foundation container with a pump according to an embodiment of the present invention will be described with reference to accompanying drawings.

Figure 1:
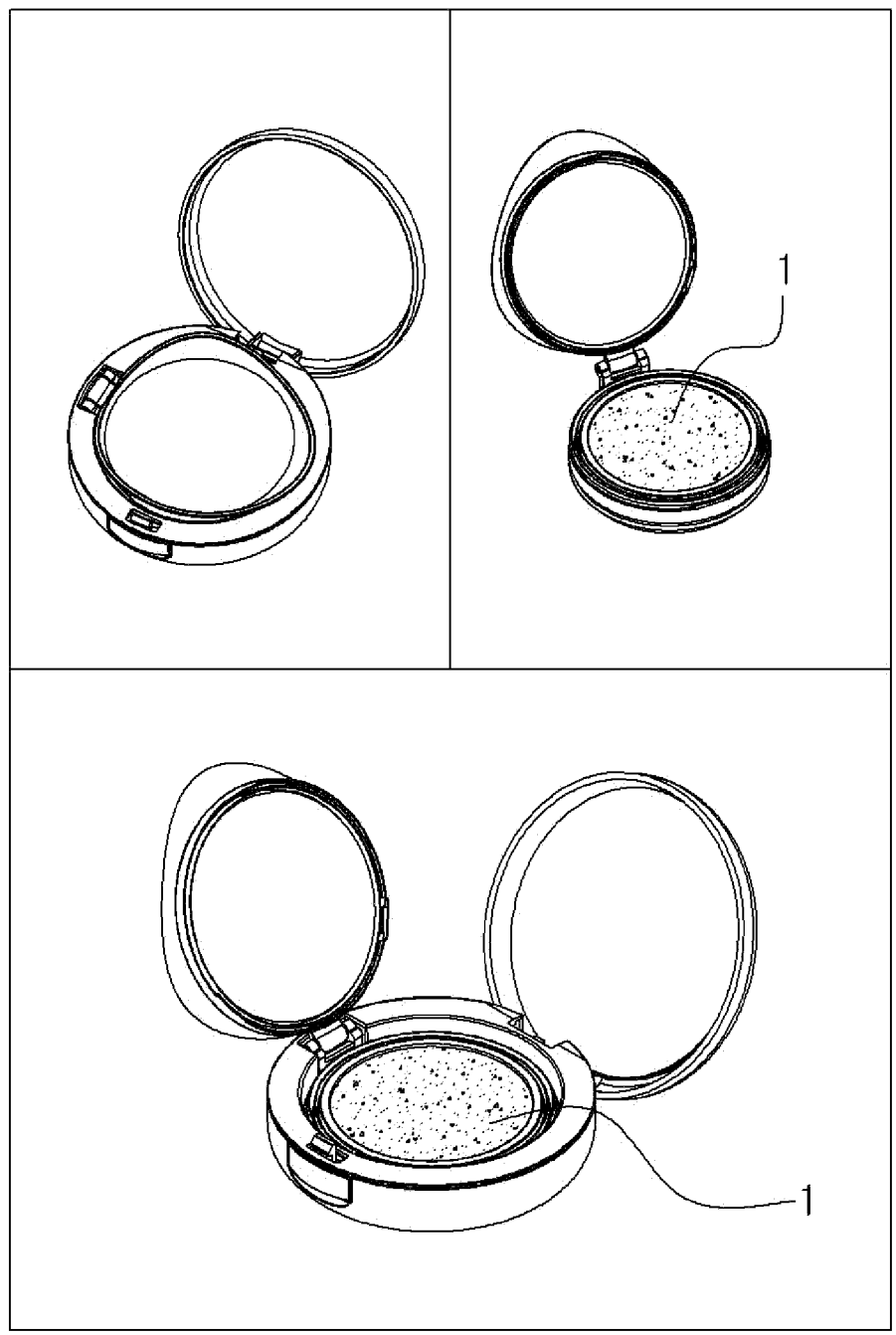
FIG. 1 is a perspective view showing a state where a lid of a compact container according to the related art is opened.
Figure 2:
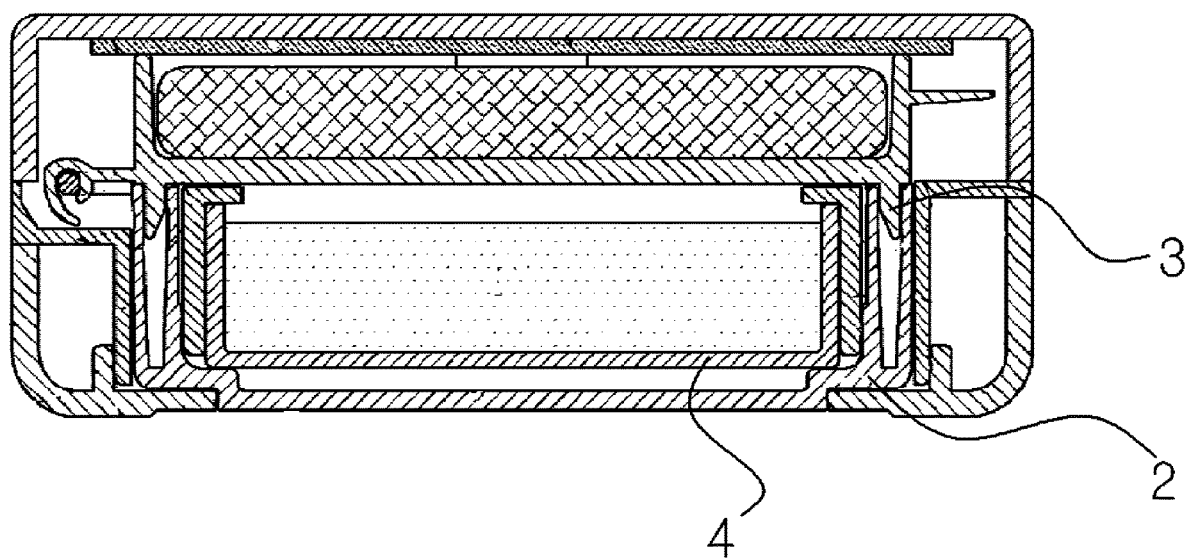
FIGS. 2 and 3 are sectional views showing a compact container according to the related art.
Figure 3:
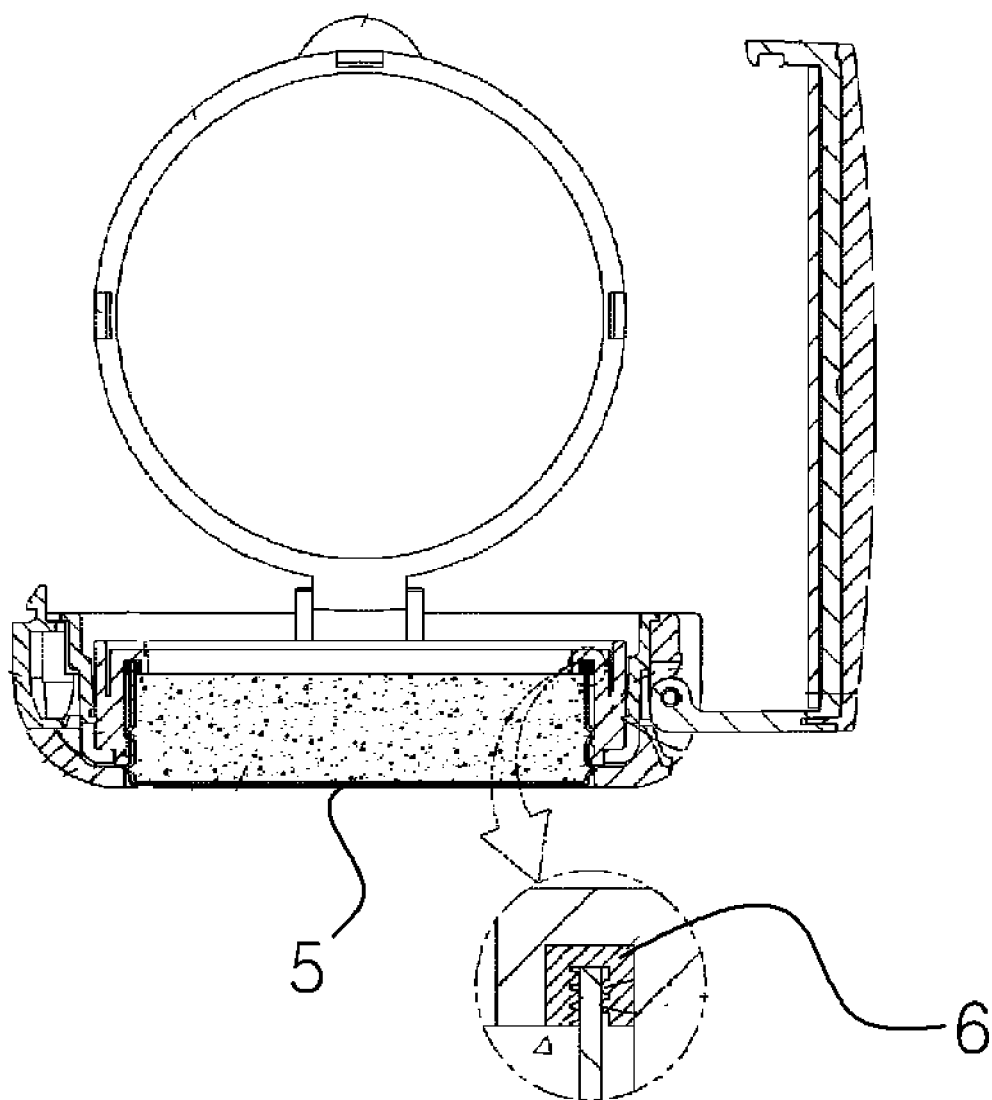
Figure 4:
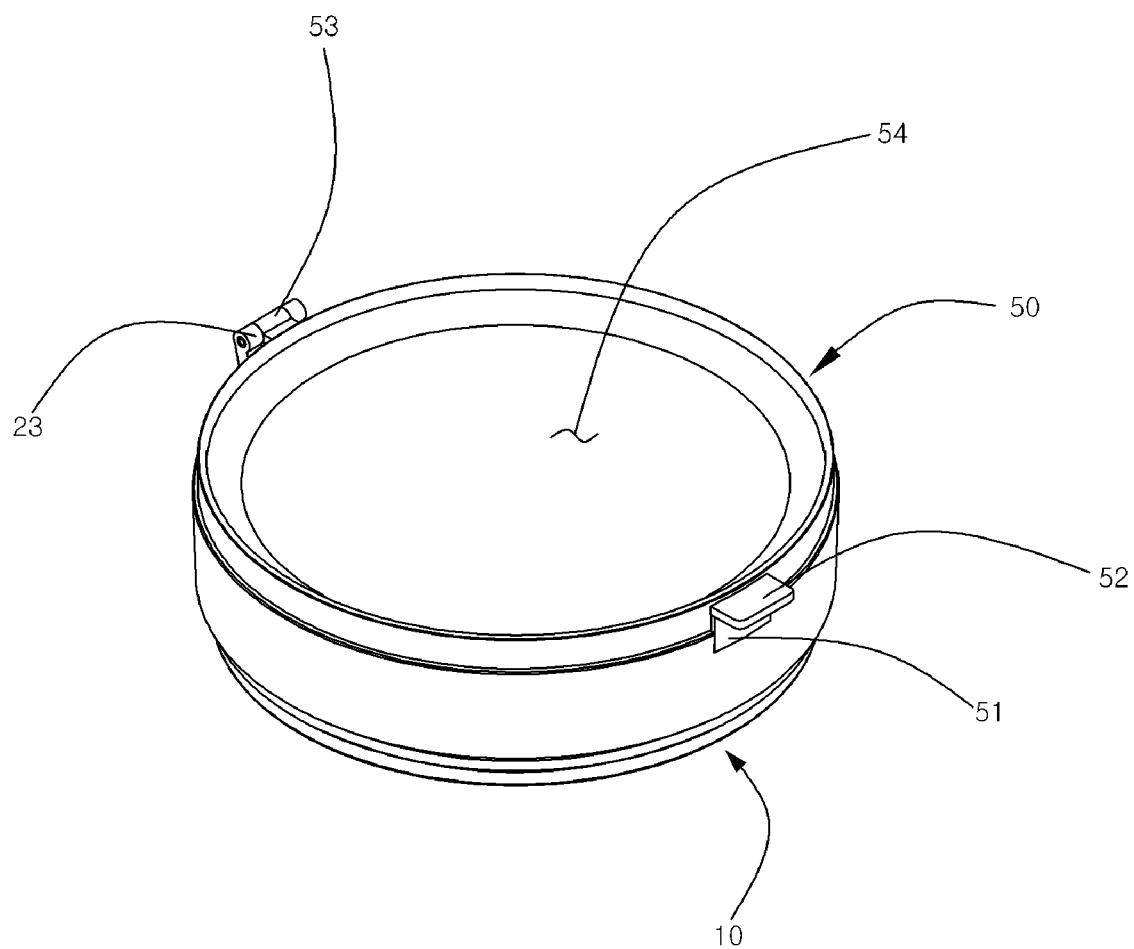
FIG. 4 is a perspective view showing a refill container using double injection molding according to an embodiment of the present invention.
Figure 5:
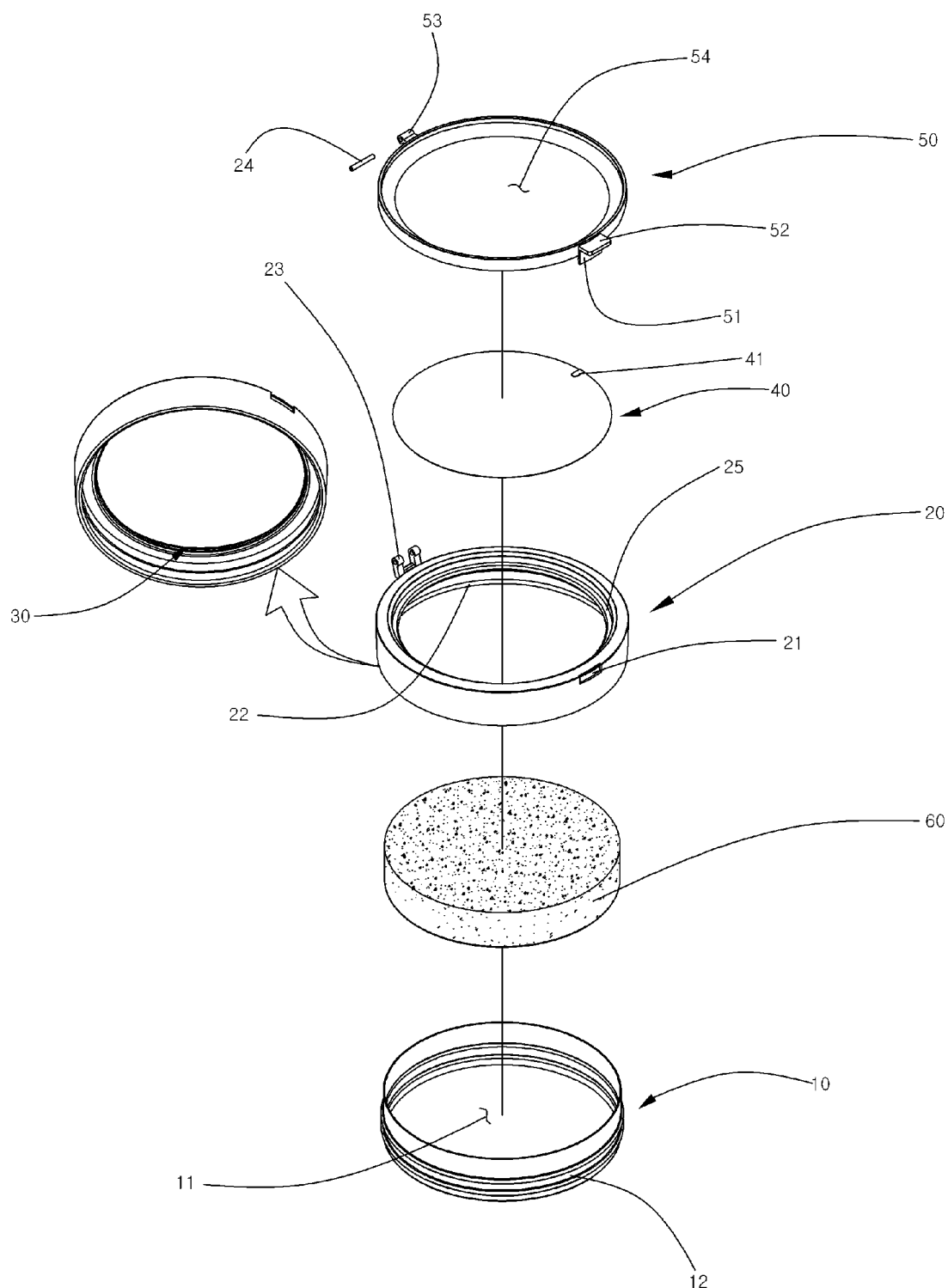
FIG. 5 is an exploded perspective view showing a refill container using double injection molding according to an embodiment of the present invention.
Figure 6:
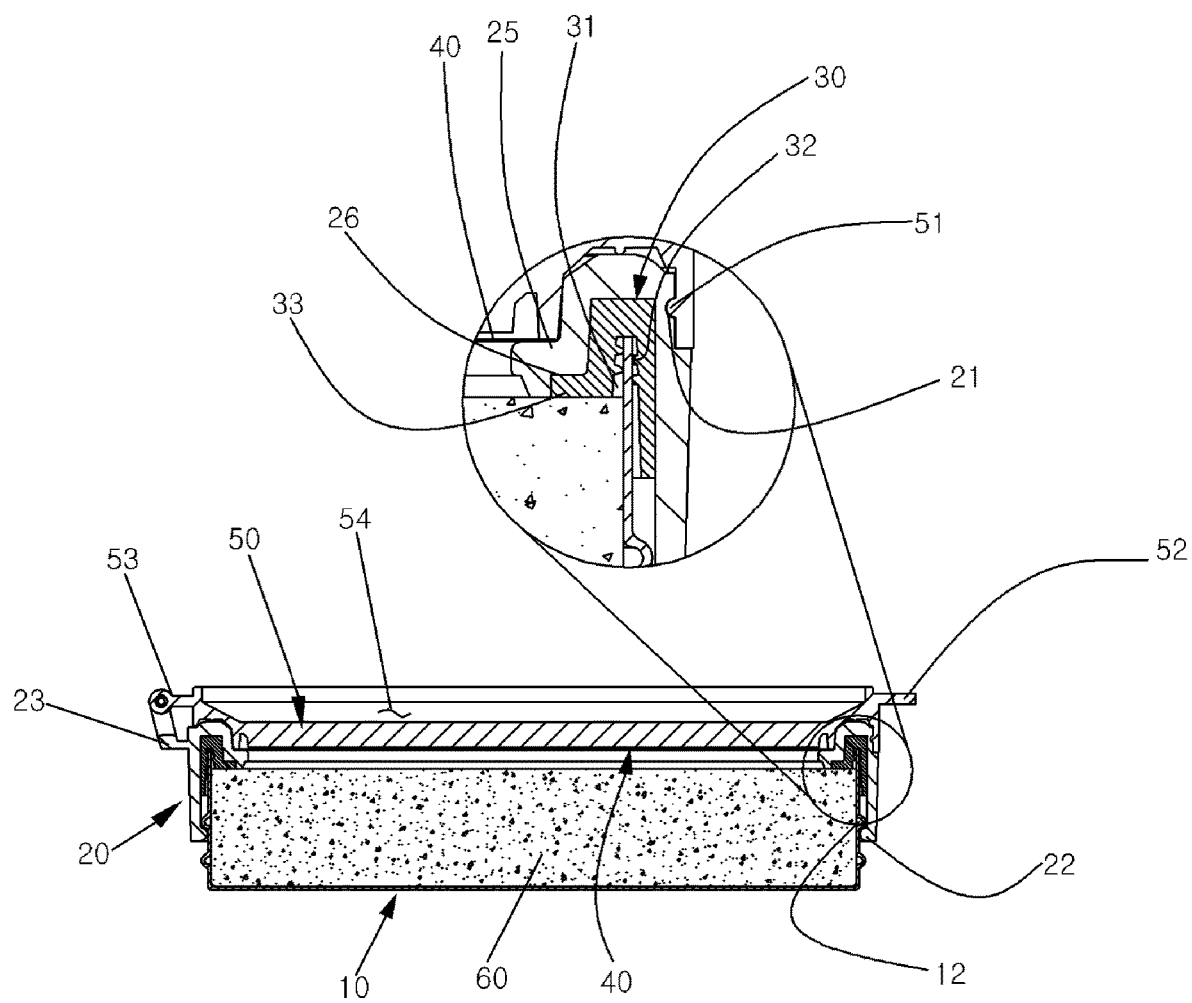
FIG. 6 is a sectional view showing a refill container using double injection molding according to an embodiment of the present invention.
Figure 7:
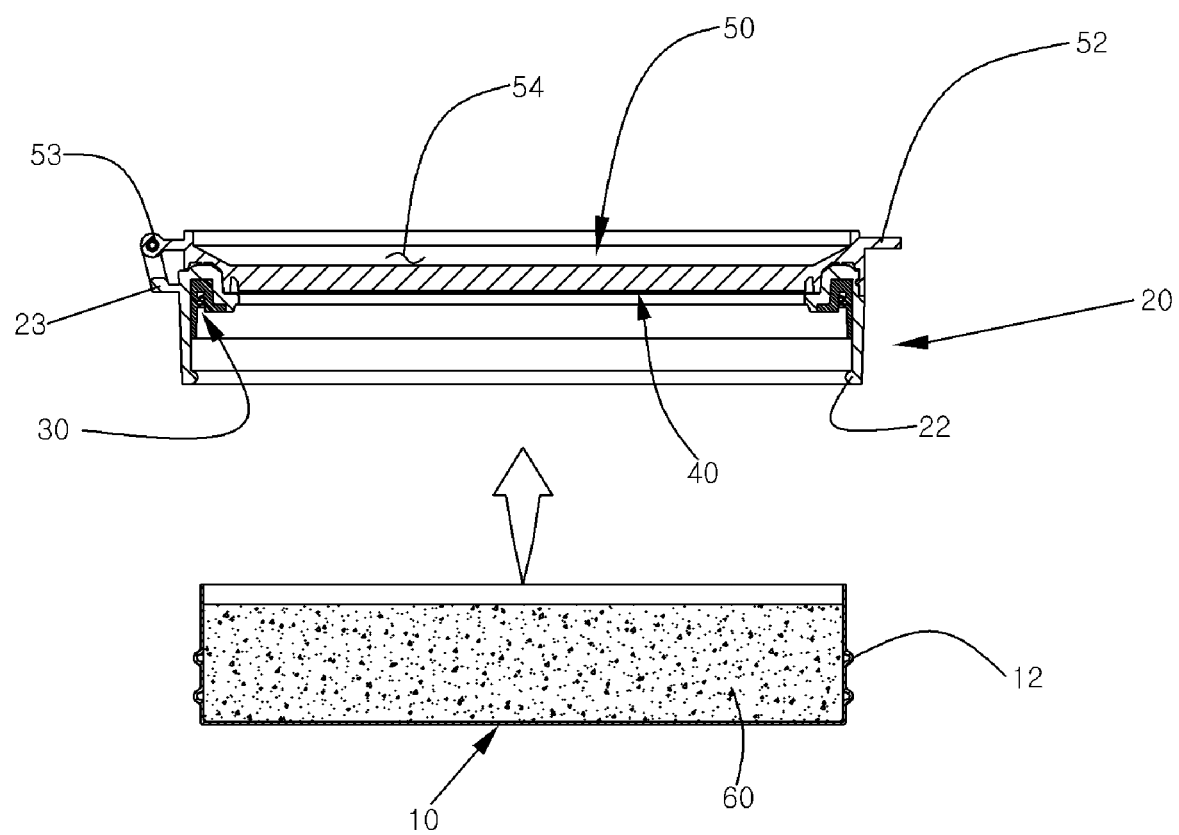
FIG. 7 is a sectional view showing a coupling state of a refill container using double injection molding according to an embodiment of the present invention.
Figure 8:
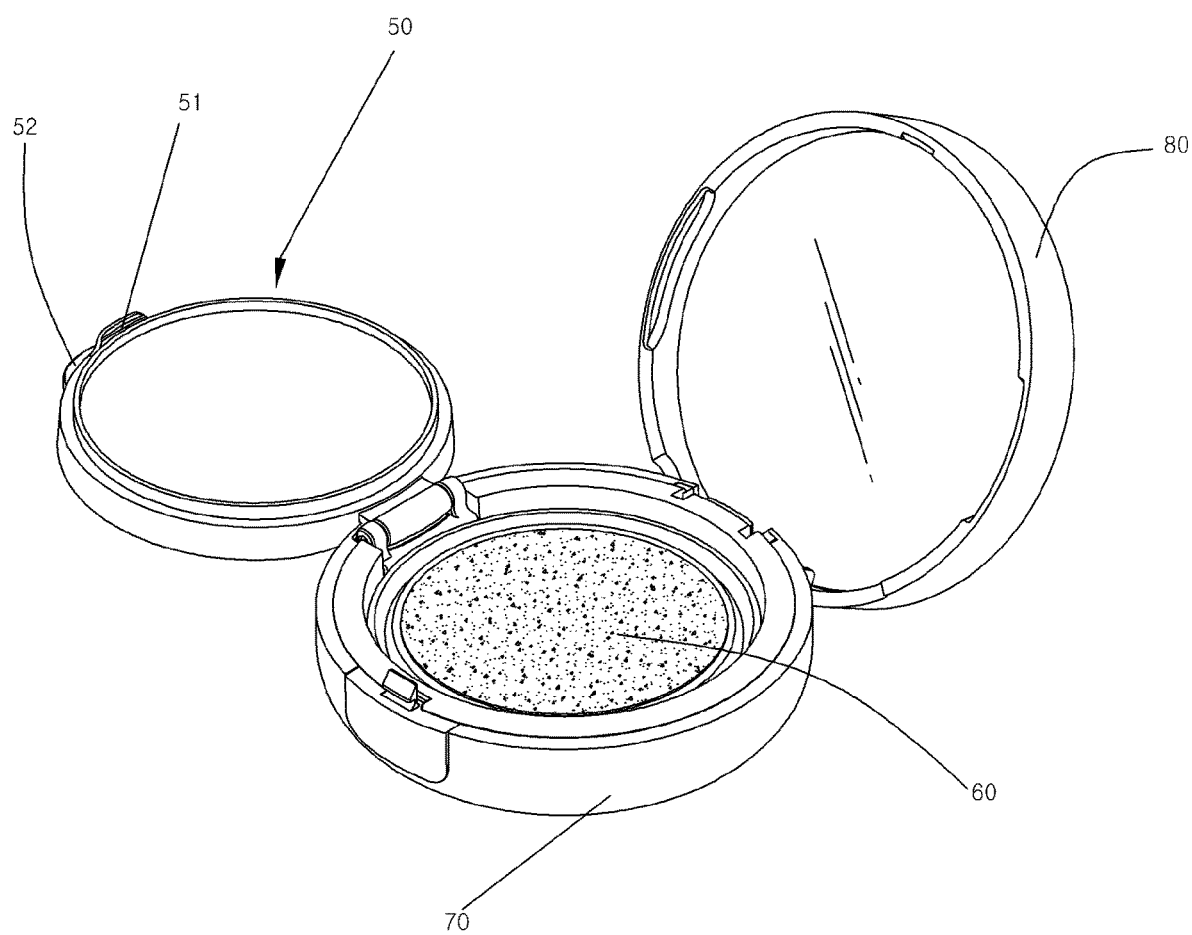
FIG. 8 is a perspective view showing a state where a refill container using double injection molding is coupled to a compact case according to an embodiment of the present invention.
Figure 9:
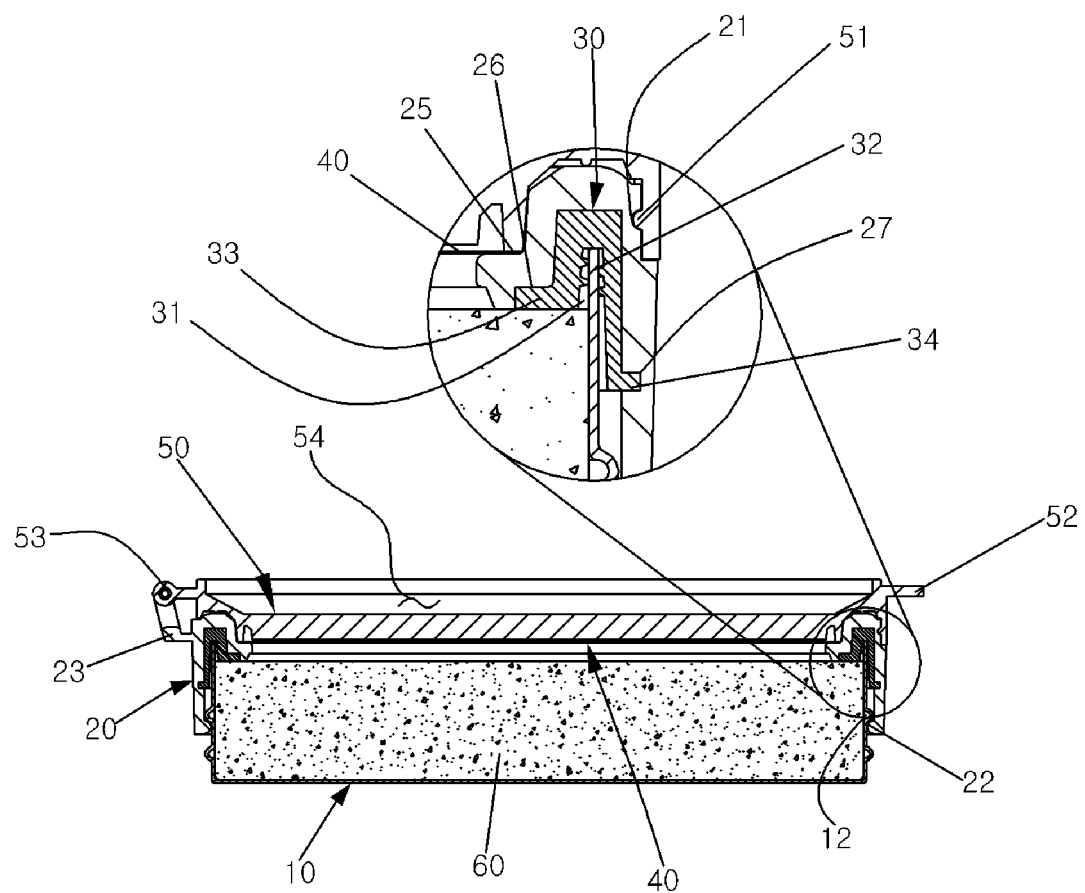
FIG. 9 is a sectional view showing a refill container using double injection molding according to another embodiment of the present invention.

FIG. 4 is a perspective view showing a refill container using double injection molding according to an embodiment of the present invention. FIG. 5 is an exploded perspective view showing a refill container using double injection molding according to an embodiment of the present invention. FIG. 6 is a sectional view showing a refill container using double injection molding according to an embodiment of the present invention. FIG. 7 is a sectional view showing a coupling state of a refill container using double injection molding according to an embodiment of the present invention. FIG. 8 is a perspective view showing a state where a refill container using double injection molding is coupled to a compact case according to an embodiment of the present invention. FIG. 9 is a sectional view showing a refill container using double injection molding according to another embodiment of the present invention.

A refill container using double injection molding according to the present invention includes a refill container 10 containing cosmetics, a refill container holder 20 coupled to an upper portion of the refill container 10, and a refill container lid 50 connected to the refill container holder 20 to be opened and closed, where a packing part 30 of an elastic material is formed through double-injection molding or insert molding on a portion where an upper end of the refill container 10 is coupled to an inside of the refill container holder 20.

The refill container 10 is formed of a synthetic resin or a metal material, has a cosmetic containing space 11 therein, and has a first latching protrusion wheel 12 on an outer peripheral surface thereof.

Specifically, when the refill container 10 is formed of a metal material, the refill container 10 may be formed to have a thin thickness, thereby maximizing the cosmetic containing space 11.

Preferably, the refill container 10 is formed of at least one of stainless steel, iron (Fe), aluminum (Al), copper (Cu), tungsten (W), nickel (Ni), tin (Sn), magnesium (Mg), calcium (Ca), titanium (Ti), zinc (Zn), and gallium (Ga)

The cosmetics may be directly contained in the cosmetic containing space 11. Alternatively, an impregnation member 60 impregnated with the cosmetics may be mounted in the cosmetic containing space 11.

In the embodiment, the refill container mounted with the impregnation member 60 will be described.

The impregnated member 60 is formed of at least one selected from the group of consisting butadiene rubber (BR), styrene butadiene rubber (SBR), natural rubber (NR), natural rubber styrene butadiene rubber (NRSBR), acrylonitrile-butadiene rubber (NBR), wet urethane, dry urethane, polyester, polyvinyl chloride, polyethylene, latex, silicon, polyvinyl alcohol (PVA), nitrile rubber, isobutylene-isoprene rubber, and neoprene.

The first latching protrusion wheel 12 is coupled to the second latching protrusion wheel 22 formed on the inner peripheral surface of the refill container holder 20 such that the refill container 10 and the refill container holder 20 are coupled to each other.

The refill container 10 is fittingly coupled with the refill container holder 20, but the refill container 10 and the refill container holder 20 may be coupled to each other through various methods such as undercut coupling, screw coupling, and the like.

Since the refill container 10 is exchangeable, only the refill container 10 may be exchanged without replacing the entire cosmetic case, so that the remaining components may be reused.

The refill container holder 20 is formed on an outer peripheral surface of an upper end thereof with a fastening groove 21 and is formed on an inner peripheral surface of a low portion thereof with the second latching protrusion wheel 22.

In addition, the refill container holder 20 is formed with a hinge bracket 23 for coupling with the refill container lid 50, and an adhesive piece 25 is formed on an upper inside of the refill container holder 20.

The fastening groove 21 is formed on an upper end of the outer peripheral surface of the refill container holder 20 and is engaged with the fastening protrusion 51 of the refill container lid 50 to increase the airtightness of the refill container 10.

The second latching protrusion wheel 22 is coupled to the first latching protrusion wheel 12 formed on the outer peripheral surface of the refill container 10 such that the refill container 10 is fixedly coupled to the refill container holder 20.

The hinge bracket is formed on a side surface of the refill container holder 20 and hinged to the refill container lid 50 by a hinge pin.

The adhesive piece 25 extends inwardly from the upper end of the refill container holder 20 and is bent downward.

The adhesive piece 25 pushes a rim portion of the impregnation member 60 contained in the refill container 10, such that the impregnation member 60 is prevented from moving and at the same time, a sealing paper 40 is adhered as shown in FIG. 6.

The adhesive piece 25 may be formed integrally with the refill container holder 20 or may be formed separately from the refill container holder 20.

The sealing paper 40 may be formed of a synthetic resin material or an aluminum material, and may be formed at one side thereof with a handle 41. The sealing paper 40 may be easily separated by gripping the handle 41.

The sealing paper 40 prevents the cosmetics contained in the refill container 10 from being volatilized and prevents the cosmetics from being deteriorated or ruined.

As shown in FIG. 6, a control protrusion wheel coupling groove 26 is formed below the adhesive piece 25, and the control protrusion wheel 33, which controls an injection flow when the packing part 30 is formed through double injection molding or insert molding flow, is molded in the control protrusion wheel coupling groove 26.

If the packing part 30 is double injection molded into the refill container holder 20 without the control protrusion wheel 33, the injection speed of the synthetic resin is too fast, so that the synthetic resin flows therethrough before the sealing protrusion wheel 32 is molded, so it is difficult to precisely mold the packing part 30.

Therefore, in order to lower the injection rate of the synthetic resin to be injected, the control protrusion wheel coupling groove 26 is formed in the refill container holder 20 to inject the synthetic resin into the control protrusion wheel coupling groove 26. The injected synthetic resin is struck against the walls of the control protrusion wheel coupling groove 26 so that the injection rate is lowered and then the synthetic resin slowly flows along the space of the packing part 30 to form the packing part 20 so that the sealing protrusion wheel 32 is precisely formed and the control protrusion wheel 33 is finally molded.

The packing part 30 is formed to increase the sealing strength when the refill container 10 made of metal and the refill container holder 20 made of synthetic resin are coupled to each other.

Since the packing part 30 is formed through double injection molding or insert molding at a portion where an upper end of the refill container 10 is coupled to an inside of the refill container holder 20, it is possible to seal the refill container 10 without any separate components and the assembling process is also simplified, thereby improving the productivity and reducing the cost.

In addition, since the packing part 30 is formed through double injection molding or insert molding, unlike the related art, the packing part 30 cannot be separated from the refill container holder 20 so that the sealing strength may be more improved.

As shown in FIG. 6, the inserting groove 31 is formed inside the packing part 30, so that the upper end of the refill container 10 is inserted into the inserting groove 31.

The sealing protrusion wheels 32 are formed in the inserting groove 31 while facing each other, such that the sealing protrusion wheels 32 are offset from each other as shown in FIG. 6.

Since the sealing protrusion wheels 32 are offset from each other, as shown in FIG. 6, the side surface of the refill container 10 is cross-pressed by the sealing protrusion wheels 32 so that the sealing strength can be improved.

Preferably, the packing part 30 is formed of at least one of thermo plastic elastomer (TPE), polyethylene (PE), natural rubber, urethane rubber, nitrile-butadiene rubber (NBR), and silicone.

As shown in FIG. 9, the coupling protrusion wheel 34 is formed on an outer periphery of an opposite side of the packing part 30. When the packing part 30 is formed through double injection molding or insert molding on injection molding while the coupling protrusion wheel 34 is coupled into the coupling groove 27 formed on an inner periphery of an opposite side of the refill container holder 20, the packing part 30 is prevented from being separated from the refill container holder 20.

The refill container lid 50 is hinge coupled to the refill container holder 20.

The fastening protrusion 51 is formed on a low end of the refill container lid 50. The fastening protrusion 51 is coupled into the fastening groove 21 of the refill container holder 20 to increase the airtightness of the refill container 10.

An opening handle 52 for easily opening or closing the refill container lid 50 is formed on one side surface of the refill container lid 50.

A hinge protrusion 53 is formed at one side of the refill container lid 50 and is inserted into a hinge bracket 23 of the refill container holder 20 so that the hinge protrusion 53 is fixed by a hinge pin 24.

In addition, a puff receiving groove 54 for keeping a puff (not shown) which is a makeup tool is formed on a top surface of the refill container lid 50.

Hereinafter, a method of assembling the refill container using double injection molding according to an embodiment of the present invention and a state of using the same will be described in detail.

In order to assemble the refill container using double injection molding according to the present invention, the refill container lid 50 is hinge coupled to the refill container holder 20 formed at an inside thereof with the packing part 30 through double injection molding or insert molding.

Then, as shown in FIG. 7, the refill container 10 is coupled to the refill container holder 20 from the bottom to the top thereof, and the refill container 10 is equipped with the impregnation member 60 impregnated with cosmetics.

Then, the sealing paper 40 is adhered to the adhesive piece 25 of the refill container holder 20.

As shown in FIG. 8, in order to use the refill container using double injection molding assembled by the above-described method, the refill container is mounted on a compact case including an outer container 70 and an outer container lid 80.

As described above, the refill container using double injection molding described in this disclosure is an illustrative purpose only, and the present invention is not limited thereto. Thus, it should be understood that numerous other modifications and embodiments can be devised by those skilled in the art within the spirit and scope of the present invention and they will fall within the scope of the present invention.

DESCRIPTION OF REFERENCE NUMERAL

10: Refill container
11: Cosmetic containing space
12: First latching protrusion wheel
20: Refill container holder
21: Fastening groove
22: Second latching protrusion wheel
23: Hinge bracket
24: Hinge pin
25: Adhesive piece
26: Control protrusion coupling groove
27: Coupling groove
30: Packing part
31: Inserting groove
32: Sealing protrusion wheel
33: Control protrusion wheel
34: Coupling protrusion wheel
40: Sealing paper
41: Handle
50: Refill container lid
51: Fastening protrusion
52: Opening handle
53: Hinge protrusion
54: Puff receiving groove
60: Impregnation member
70: Outer container
80: Outer container lid

The invention claimed is:

1. A refill container using double injection molding, the refill container comprising:
a refill container (10) containing cosmetics;
a refill container holder (20) coupled to an upper portion of the refill container (10); and
a refill container lid (50) connected to the refill container holder (20) to be opened and closed,
wherein a packing part (30) of an elastic material is formed to an inside of the refill container holder (20) through double-injection molding or insert molding on a portion where an upper end of the refill container (10) is coupled,
wherein a control protrusion coupling groove (26) is formed on a portion of one side of the refill container holder (20), the portion being lower than the refill container lid (50), and
wherein the control protrusion coupling groove (26) forms a wall to control an injection flow of an injected synthetic resin when the packing part (30) is formed during molding of a control protrusion (33) in the control protrusion coupling groove (26),
wherein the packing part (30) is formed on an inside thereof with an inserting groove (31) into which an upper portion of the refill container (10) is inserted.

2. The refill container using double injection molding of claim 1, further comprising an impregnation member (60) impregnated therein with the cosmetics and mounted in the refill container (10).

3. The refill container using double injection molding of claim 1, wherein the refill container (10) is formed on an outer peripheral surface thereof with a first latching protrusion (12) and the refill container holder (20) is formed on an inner peripheral surface thereof with a second latching protrusion (22) coupled to the first latching protrusion (12).

4. The refill container using double injection molding of claim 1, wherein the refill container (10) is formed of synthetic resin material.

5. The refill container using double injection molding of claim 1, wherein the refill container (10) is formed of at least one of stainless steel, iron (Fe), aluminum (Al), copper (Cu), tungsten (W), nickel (Ni), tin (Sn), magnesium (Mg), calcium (Ca), titanium (Ti), zinc (Zn), and gallium (Ga).

6. The refill container using double injection molding of claim 1, wherein the packing part (30) is formed of at least one of thermo plastic elastomer (TPE), polyethylene (PE), natural rubber, urethane rubber, nitrile-butadiene rubber (NBR), and silicone.

7. The refill container using double injection molding of claim 1, wherein sealing protrusions (32) are formed in the inserting groove (31) while facing each other.

8. The refill container using double injection molding of claim 7, wherein the sealing protrusions (32) are offset from each other.

9. The refill container using double injection molding of claim 1, wherein the packing part (30) is formed on an outer periphery of an opposite side thereof with a coupling protrusion (34), the refill container holder (20) is formed on an inner periphery of an opposite side thereof with a coupling groove (27), and the coupling protrusion (34) and the coupling groove (27) are coupled to each other.

* * * * *